(12) United States Patent
Perell et al.

(10) Patent No.: US 9,365,339 B2
(45) Date of Patent: Jun. 14, 2016

(54) PACKAGE WITH UNIQUE OPENING DEVICE AND PROCESS FOR FORMING PACKAGE

(75) Inventors: William Perell, San Francisco, CA (US); Leif Sorensen, Cape Canaveral, FL (US)

(73) Assignee: PopPack, LLC, San Francisco, CA (US)

(*) Notice: Subject to any disclaimer, the term of this patent is extended or adjusted under 35 U.S.C. 154(b) by 480 days.

(21) Appl. No.: 12/703,947

(22) Filed: Feb. 11, 2010

(65) Prior Publication Data
US 2011/0192736 A1 Aug. 11, 2011

(51) Int. Cl.
*B65B 31/00* (2006.01)
*B65D 75/58* (2006.01)
*B29C 65/76* (2006.01)
*B29C 65/00* (2006.01)
*B65B 61/18* (2006.01)
(Continued)

(52) U.S. Cl.
CPC .............. *B65D 75/58* (2013.01); *B29C 65/48* (2013.01); *B29C 65/76* (2013.01); *B29C 66/1122* (2013.01); *B29C 66/439* (2013.01); *B29C 66/81422* (2013.01); *B29C 66/836* (2013.01); *B29C 66/8362* (2013.01); *B29C 66/8432* (2013.01); *B65B 61/18* (2013.01); *B29C 65/482* (2013.01); *B29C 65/485* (2013.01); *B29C 65/4825* (2013.01); *B29C 65/4835* (2013.01); *B29C 65/4845* (2013.01); *B29C 65/4865* (2013.01); *B29C 65/5057* (2013.01)

(58) Field of Classification Search
CPC ........ B65D 75/58; B65B 61/18; B29C 65/48; B29C 65/76; B29C 66/1122; B29C 66/439; B29C 66/81422; B29C 65/5057

USPC .................... 53/403, 406, 407, 79
See application file for complete search history.

(56) References Cited

U.S. PATENT DOCUMENTS

| 2,916,886 A | 12/1959 | Robbins |
| 3,074,544 A | 1/1963 | Bollmeier et al. |
| 3,120,336 A | 2/1964 | Whatley, Jr. |

(Continued)

FOREIGN PATENT DOCUMENTS

| DE | 20314741 | 1/2004 |
| EP | 00306207 A1 | 3/1989 |

(Continued)

OTHER PUBLICATIONS

U.S. Appl. No. 12/434,254, filed May 1, 2009, Package with one or More Access Points for Breaking one or more Seals and Accessing the Contents of the Package.
U.S. Appl. No. 12/704,914, filed Feb. 12, 2010 entitled Package Containing a Breachable Bubble in Combination with a Closure Device.

(Continued)

*Primary Examiner* — Sameh Tawfik
(74) *Attorney, Agent, or Firm* — Dority & Manning, P.A.

(57) ABSTRACT

A package and a process for forming the package are provided. The process may include providing a first flexible polymer film and a second flexible polymer film, sealing the first film and the second film together to form an enclosure and at least one tab area, and trapping fluid within a discrete portion of the tab area to form a breachable bubble. The enclosure may define an interior volume configured to receive a consumer product. Fluid trapped within a discrete portion of the tab area to form a breachable bubble may be sufficient to cause the bubble to breach upon application of minimal pressure by a user, separating a sealed portion of the first film from the second film.

19 Claims, 6 Drawing Sheets

(51) Int. Cl.
B29C 65/50 (2006.01)
B29C 65/48 (2006.01)

(56) References Cited

U.S. PATENT DOCUMENTS

| | | | |
|---|---|---|---|
| 3,189,227 A | 6/1965 | Hobbs et al. | |
| 3,256,981 A | 6/1966 | Kurtz | |
| 3,294,227 A | 12/1966 | Schneider et al. | |
| 3,301,390 A | 1/1967 | Via, Jr. | |
| 3,325,575 A * | 6/1967 | Last | 264/569 |
| 3,342,326 A | 9/1967 | Zackheim | |
| 3,419,137 A | 12/1968 | Walck, III | |
| 3,466,356 A * | 9/1969 | Zavitz et al. | 264/567 |
| 3,478,871 A | 11/1969 | Sager | |
| 3,573,069 A | 3/1971 | Keller et al. | |
| 3,608,709 A | 9/1971 | Pike | |
| 3,635,376 A | 1/1972 | Hellstrom | |
| 3,835,995 A * | 9/1974 | Haines | 206/536 |
| 3,847,279 A | 11/1974 | Montgomery | |
| 3,859,895 A * | 1/1975 | White | 493/194 |
| 3,921,805 A | 11/1975 | Compere | |
| 3,960,997 A * | 6/1976 | Sorensen | 264/40.3 |
| 3,964,604 A | 6/1976 | Prenntzell | |
| 4,275,840 A | 6/1981 | Staar | |
| 4,301,923 A | 11/1981 | Vuorento | |
| 4,375,383 A | 3/1983 | Sewell et al. | |
| 4,402,402 A | 9/1983 | Pike | |
| 4,442,259 A | 4/1984 | Isgur et al. | |
| 4,485,920 A | 12/1984 | Skylvik | |
| 4,511,052 A | 4/1985 | Klein et al. | |
| D279,808 S | 7/1985 | Pharo | |
| 4,540,089 A | 9/1985 | Maloney | |
| 4,597,244 A | 7/1986 | Pharo | |
| 4,610,684 A | 9/1986 | Knox et al. | |
| 4,632,244 A | 12/1986 | Landau | |
| 4,704,314 A | 11/1987 | Hsu et al. | |
| 4,711,359 A | 12/1987 | White et al. | |
| 4,759,472 A | 7/1988 | Strenger | |
| 4,793,123 A | 12/1988 | Pharo | |
| 4,798,288 A | 1/1989 | Holzner | |
| 4,859,521 A | 8/1989 | Pike et al. | |
| 4,872,556 A | 10/1989 | Farmer | |
| 4,872,558 A | 10/1989 | Pharo | |
| 4,874,093 A | 10/1989 | Pharo | |
| 4,889,884 A | 12/1989 | Dust et al. | |
| 4,890,744 A | 1/1990 | Lane, Jr. et al. | |
| 4,898,280 A * | 2/1990 | Runge | 383/200 |
| 4,902,370 A | 2/1990 | Dust et al. | |
| 4,918,904 A | 4/1990 | Pharo | |
| 4,949,530 A | 8/1990 | Pharo | |
| 4,961,495 A | 10/1990 | Yoshida et al. | |
| 5,050,736 A | 9/1991 | Griesbach | |
| 5,100,028 A | 3/1992 | Seifert | |
| 5,114,004 A | 5/1992 | Isono et al. | |
| 5,126,070 A | 6/1992 | Leifheit et al. | |
| 5,131,760 A | 7/1992 | Farmer | |
| 5,137,154 A * | 8/1992 | Cohen | 206/522 |
| 5,207,320 A | 5/1993 | Allen | |
| 5,215,221 A | 6/1993 | Dirksing | |
| 5,272,856 A | 12/1993 | Pharo | |
| 5,325,968 A | 7/1994 | Sowden | |
| 5,373,966 A | 12/1994 | O'Reilly et al. | |
| 5,427,830 A | 6/1995 | Pharo | |
| 5,445,274 A | 8/1995 | Pharo | |
| 5,447,235 A | 9/1995 | Pharo | |
| 5,487,470 A | 1/1996 | Pharo | |
| 5,492,219 A | 2/1996 | Stupar | |
| 5,564,591 A | 10/1996 | Christine | |
| 5,588,532 A | 12/1996 | Pharo | |
| 5,616,400 A | 4/1997 | Zhang | |
| D386,074 S | 11/1997 | Pharo | |
| 5,711,691 A | 1/1998 | Damask et al. | |
| 5,775,491 A | 7/1998 | Taniyama | |
| 5,792,213 A | 8/1998 | Bowen | |
| 5,814,159 A | 9/1998 | Paley et al. | |
| 5,824,392 A | 10/1998 | Gothoh | |
| 5,865,309 A | 2/1999 | Futagawa et al. | |
| 5,870,884 A | 2/1999 | Pike | |
| 5,910,138 A | 6/1999 | Sperko et al. | |
| 5,928,213 A | 7/1999 | Barney et al. | |
| 5,944,709 A | 8/1999 | Barney et al. | |
| 5,967,308 A | 10/1999 | Bowen | |
| 6,001,187 A | 12/1999 | Paley et al. | |
| 6,007,264 A | 12/1999 | Koptis | |
| 6,036,004 A | 3/2000 | Bowen | |
| 6,068,820 A | 5/2000 | De Guzman | |
| 6,165,161 A | 12/2000 | York et al. | |
| 6,198,106 B1 | 3/2001 | Barney et al. | |
| 6,203,535 B1 | 3/2001 | Barney et al. | |
| 6,290,801 B1 | 9/2001 | Krampe et al. | |
| 6,468,377 B1 | 10/2002 | Sperko et al. | |
| 6,491,159 B2 | 12/2002 | Shibata | |
| 6,547,468 B2 | 4/2003 | Gruenbacher et al. | |
| 6,658,400 B2 | 12/2003 | Perell et al. | |
| 6,692,150 B2 | 2/2004 | Hoshino | |
| 6,726,364 B2 | 4/2004 | Perell | |
| 6,846,305 B2 | 1/2005 | Smith et al. | |
| 6,935,492 B1 | 8/2005 | Loeb | |
| 6,938,394 B2 | 9/2005 | Perell | |
| 6,968,952 B2 | 11/2005 | Crevier et al. | |
| 6,996,951 B2 | 2/2006 | Smith et al. | |
| 7,004,354 B2 | 2/2006 | Harper | |
| 7,051,879 B2 | 5/2006 | Ramet | |
| 7,055,683 B2 | 6/2006 | Bourque et al. | |
| 7,175,614 B2 | 2/2007 | Gollier et al. | |
| 7,306,095 B1 | 12/2007 | Bourque et al. | |
| 7,306,371 B2 | 12/2007 | Perell | |
| 7,597,691 B2 | 10/2009 | Kawaguchi et al. | |
| 7,644,821 B2 | 1/2010 | Perell | |
| 2002/0150658 A1 | 10/2002 | Morrissette et al. | |
| 2002/0170832 A1 | 11/2002 | Klair | |
| 2003/0019781 A1 | 1/2003 | Kocher | |
| 2003/0113519 A1 | 6/2003 | Wasserman et al. | |
| 2004/0226848 A1 | 11/2004 | Dunn-Rankin | |
| 2006/0023976 A1 | 2/2006 | Alvater et al. | |
| 2007/0235369 A1 | 10/2007 | Perell | |
| 2007/0237431 A1 | 10/2007 | Perell | |
| 2007/0284375 A1 | 12/2007 | Perell | |
| 2007/0286535 A1 | 12/2007 | Perell | |
| 2007/0295766 A1 | 12/2007 | Perell | |
| 2008/0212904 A1 | 9/2008 | Perell | |
| 2010/0326989 A1 | 12/2010 | Perell et al. | |
| 2013/0118134 A1 | 5/2013 | Perell et al. | |

FOREIGN PATENT DOCUMENTS

| | | |
|---|---|---|
| EP | 00317130 A1 | 5/1989 |
| EP | 0709302 A1 | 5/1996 |
| FR | 2345363 A1 | 10/1977 |
| GB | 2253605 A | 9/1992 |
| JP | 04215927 A | 8/1992 |
| JP | 7-8236 | 7/1995 |
| JP | 2003146364 | 5/1996 |
| JP | 11029176 A | 2/1999 |
| JP | 200255598 A | 9/2000 |
| JP | 2002503187 | 1/2002 |
| JP | 2002037327 | 2/2002 |
| WO | WO 96/23700 A1 | 8/1996 |
| WO | WO 02/083504 A1 | 10/2002 |
| WO | WO 2004/100856 A2 | 11/2004 |
| WO | WO 2005/022323 A | 3/2005 |
| WO | WO 2005/077811 A1 | 8/2005 |
| WO | WO2009-086344 A1 | 7/2009 |
| WO | WO2009-086346 A1 | 7/2009 |
| WO | WO2009-088759 A1 | 7/2009 |

OTHER PUBLICATIONS

U.S. Appl. No. 12/703,947, filed Feb. 11, 2010, entitled Package with Unique Opening Device and Process for Forming Package.

* cited by examiner

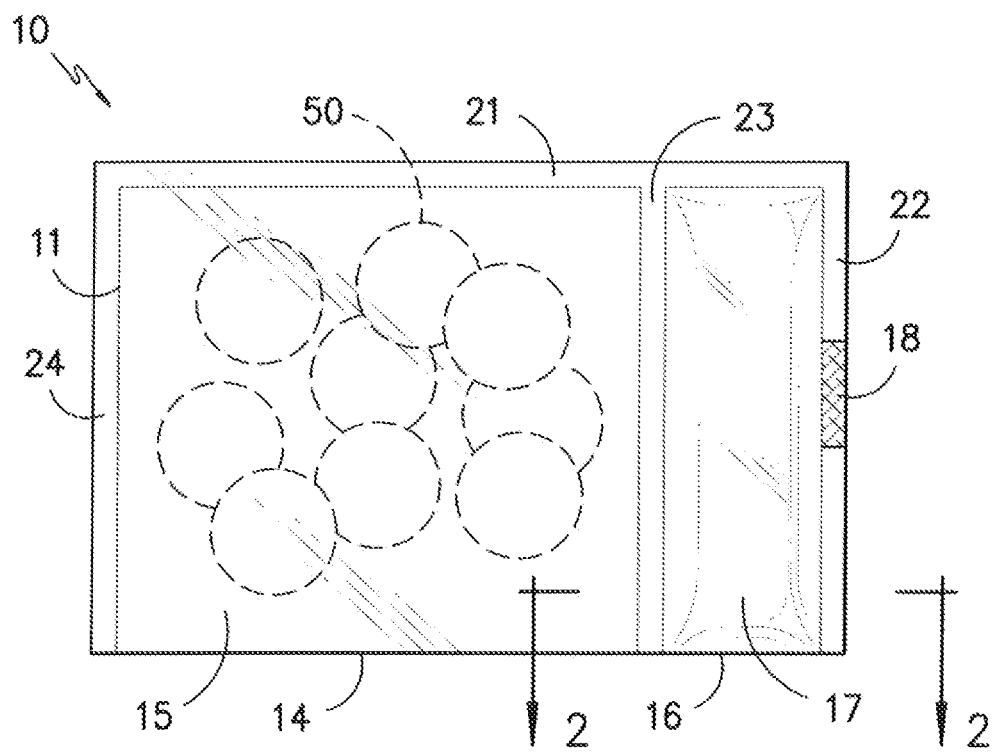
FIG. -1-
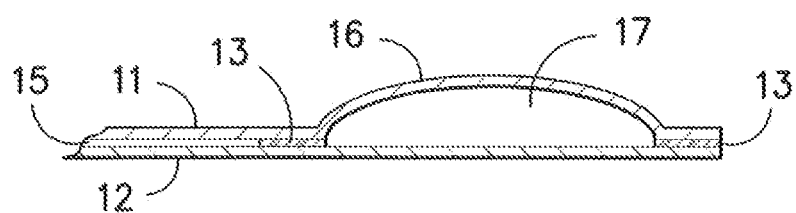
FIG. -2-

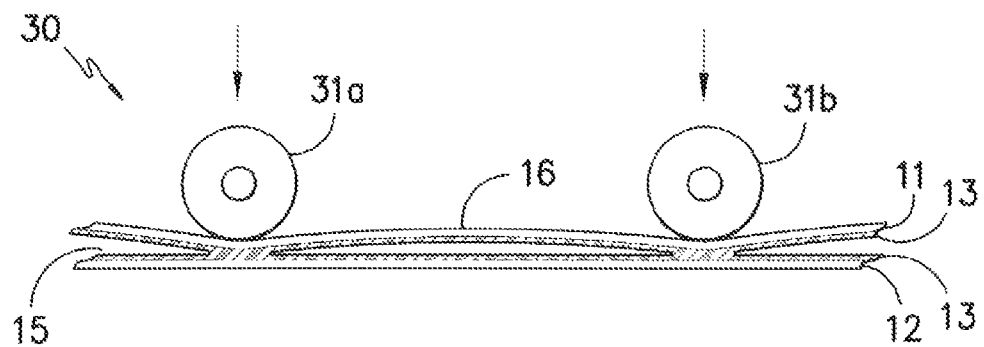
FIG. -3A-
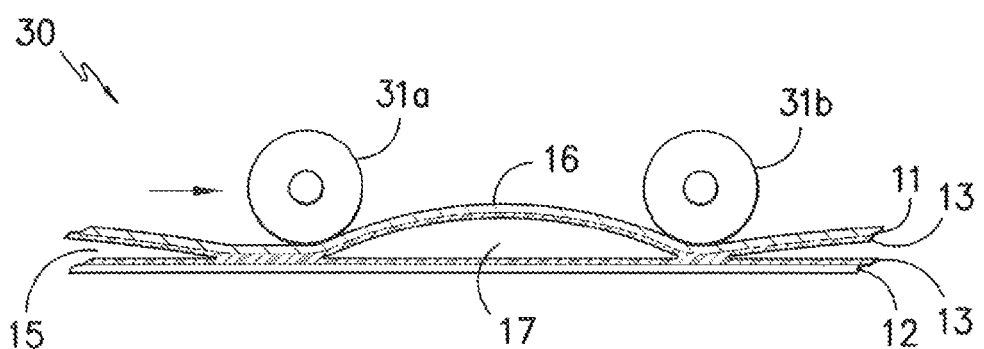
FIG. -3B-

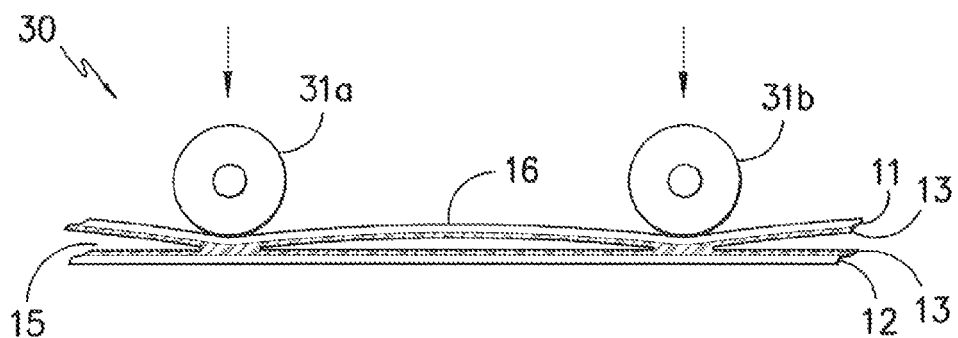
FIG. —4A—
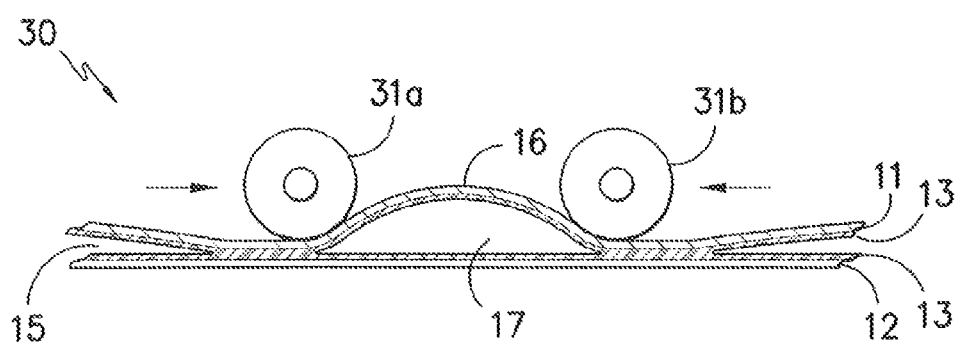
FIG. —4B—

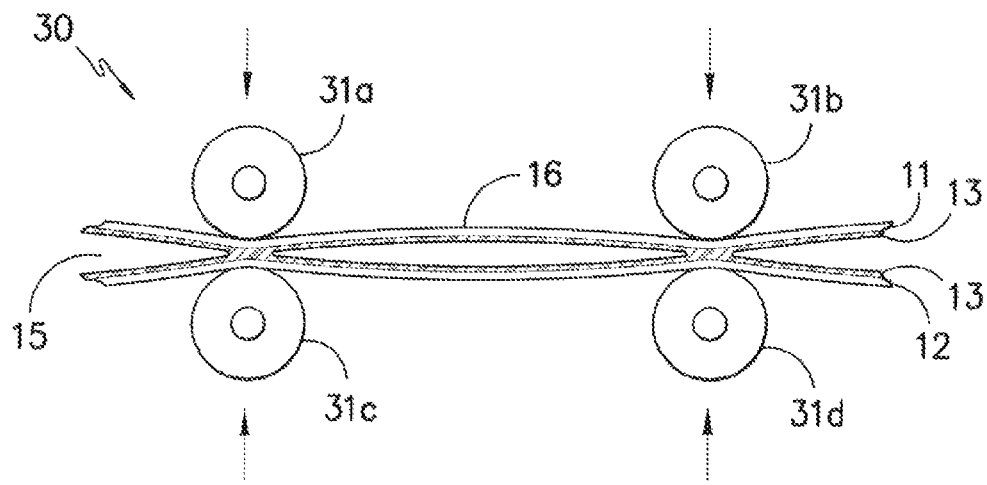
FIG. -5A-
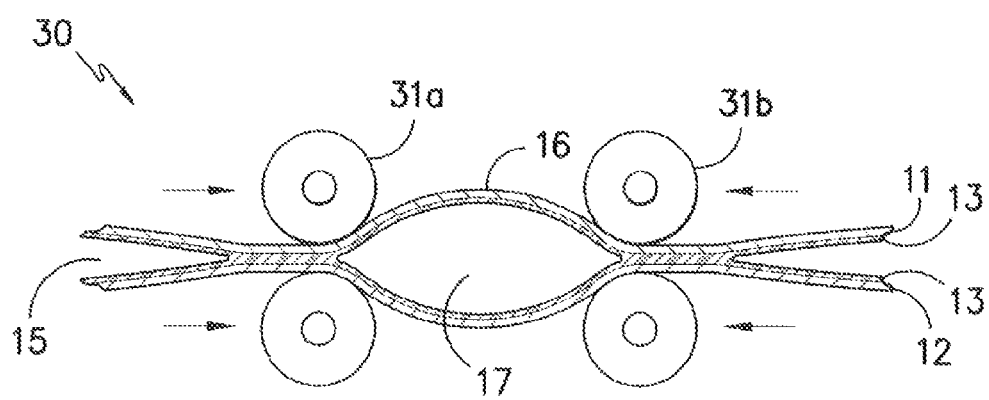
FIG. -5B-

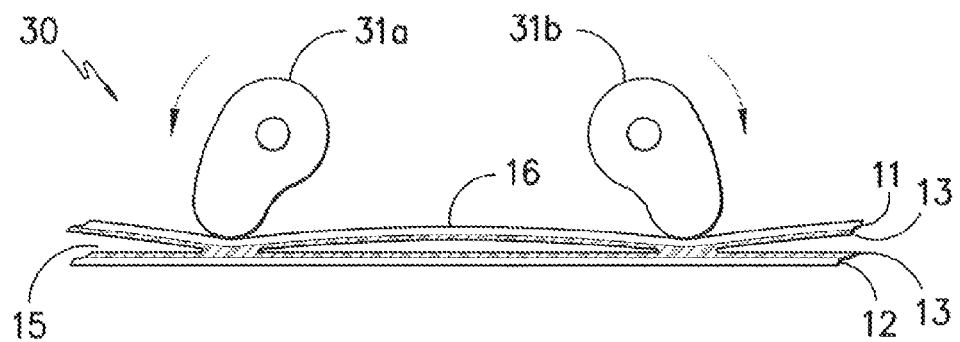
FIG. —6A—
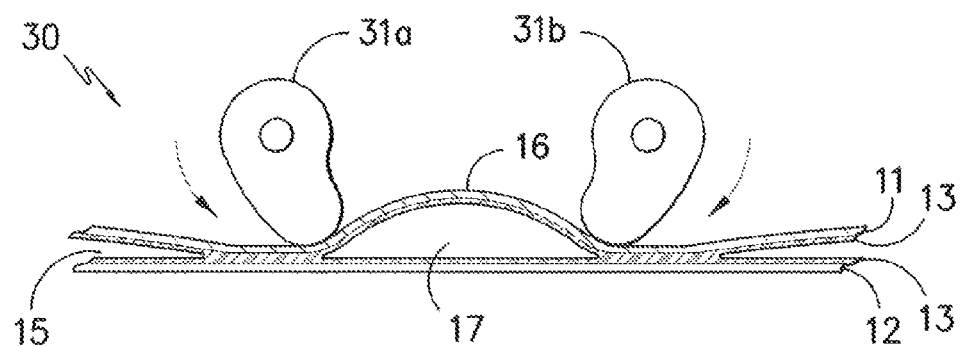
FIG. —6B—

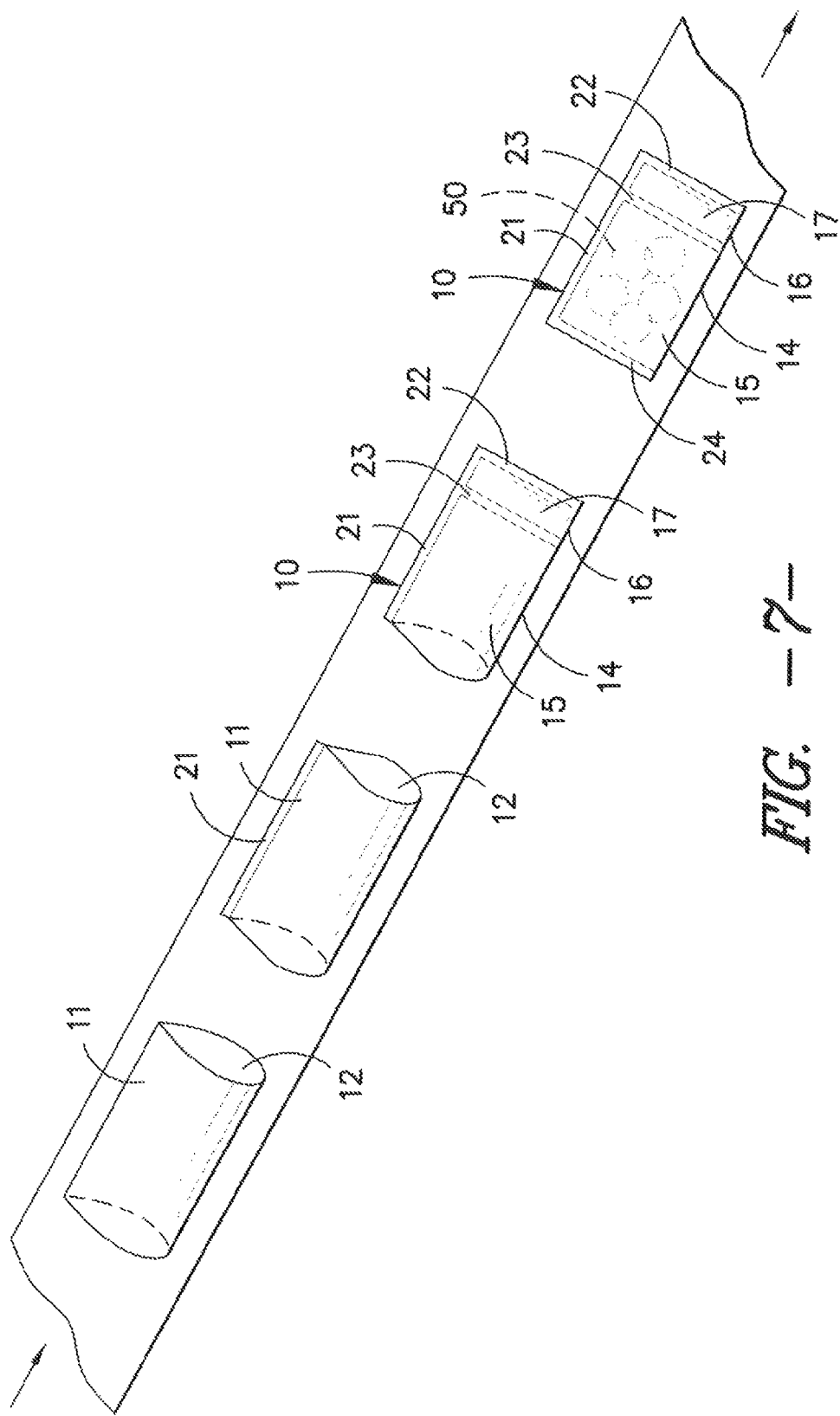
FIG. -7-

PACKAGE WITH UNIQUE OPENING DEVICE AND PROCESS FOR FORMING PACKAGE

BACKGROUND

Many products, especially consumer products, are packaged in flexible bags made from a plastic or polymer film. Packages made from polymer films can offer various advantages. For instance, the polymer films can be wrapped tightly around the consumer products for eliminating void space. The resulting packages are not very bulky and are easy to handle. The polymer films can also be translucent, allowing a purchaser to view the contents prior to making the purchase. In addition, the polymer films can be printed with decorative graphics to make the product more attractive.

Although packages made from polymer films can provide various advantages, opening such packages can be quite difficult. For example, the polymer films must have sufficient strength to prevent against rupture during the packaging process and during subsequent transportation. Increasing the strength of the film or the seals that surround the content of the package, however, increases the difficulty in opening the package. For example, many such packages, such as packages that contain cereals, potato chips, and the like, do not include an easy opening feature. Thus, brute force or scissors need to be used in order to open the package.

Additionally, many processes known in the art for forming packages made from polymer films are not suitable for forming packages with easy opening features. For example, many known processes, such as shrink wrap processes and form, fill and seal processes, provide tightly wrapped packages made from strong materials that are intended to eliminate void space and protect the product contained therein from outside influences such as puncturing. These packaging processes, and the resulting tightly wrapped packages, prevent consumers from easily opening the packages.

In view of the above, a need currently exists for a process for forming packages with easy opening features. Further, a need currently exists for a package with an opening device that facilitates easy opening of the package.

BRIEF DESCRIPTION

Aspects and advantages of the invention will be set forth in part in the following description, or may be obvious from the description, or may be learned through practice of the invention.

In one embodiment, a process for forming a package is provided. The process may include providing a first flexible polymer film and a second flexible polymer film, sealing the first film and the second film together to form an enclosure and at least one tab area, and trapping fluid within a discrete portion of the tab area to form a breachable bubble. The enclosure may define an interior volume configured to receive a consumer product. Fluid trapped within a discrete portion of the tab area to form a breachable bubble may be sufficient to cause the bubble to breach upon, application of minimal pressure by a user, separating a sealed portion of the first film from the second film.

In another embodiment, a package is provided. The package may include a first flexible polymer film and a second flexible polymer film. The first film and the second film may form an enclosure and at least one tab area. The enclosure may define an interior volume configured to receive a consumer product. The package may further include an adhesive layer, the adhesive layer providing a seal between the first film and the second film. The adhesive layer may have a chemical composition such that it can bond to itself without the application of elevated temperatures. The package may further include a breachable bubble formed within a discrete portion of the tab area. Sufficient fluid may be trapped within the breachable bubble that the bubble breaches upon application of minimal pressure by a user, separating a sealed portion of the first film from the second film.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a top view of one embodiment of a package made in accordance with the present disclosure;

FIG. 2 provides a cross-sectional view, along the line 2-2 of FIG. 1, of one embodiment of a package made in accordance with the present disclosure;

FIGS. 3A and 3B provide a side view of one embodiment of a process for forming packages in accordance with the present disclosure;

FIGS. 4A and 4B provide a side view of another embodiment of a process for forming packages in accordance with the present disclosure;

FIGS. 5A and 5B provide a side view of another embodiment of a process for forming packages in accordance with the present disclosure;

FIGS. 6A and 6B provide a side view of another embodiment of a process for forming packages in accordance with the present disclosure; and FIG. 7 provides a perspective view of one embodiment of a process for forming packages in accordance with the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

In general, the present invention is directed to a package that includes a unique opening device for opening the package, and to a process for forming the package. The package, in one embodiment, can be made from one or more layers of a polymer film. The walls of the package, for example, can be flexible. In the past, such packages have been relatively difficult to open. In accordance with the present disclosure, however, the package includes a breachable bubble formed within a discrete portion of a tab area of the package. Sufficient fluid may be trapped within the breachable bubble that the bubble may breach upon application of minimal pressure by a user. Breaching of the bubble can cause a sealed portion of the layers of polymer film to separate. The layers of polymer film can then be peeled away from each other until the package is opened and the contents accessible.

Referring to FIG. 1, reference numeral 10 generally indicates a package in accordance with one embodiment of the present invention. The package 10 may include a first flexible polymer film 11 and a second flexible polymer film 12 (see FIG. 2). In one embodiment of the present invention, the first film 11 and the second film 12 are portions of a singular sheet of flexible polymer film. In another embodiment, the first film 11 and the second film 12 are separate sheets of flexible polymer film. It should be understood that the package 10 can have any suitable shape depending upon various factors including the type of product contained in or to be received in the package.

The first flexible polymer film 11 and the second flexible polymer film 12 can be made from any suitable polymer. Polymers that may be used to form the package include, for instance, polyolefins such as polyethylene and polypropylene, polyesters, polyamides, polyvinyl chloride, mixtures thereof, copolymers thereof, terpolymers thereof, and the like. In addition, the package can also be made from any suitable elastomeric polymer.

The first flexible polymer film 11 and the second flexible polymer film 12 can each comprise a single layer of material or can comprise multiple layers. For instance, the first film 11 and the second film 12 can each include a core layer of polymeric material coated on one or both sides with other functional polymeric layers. The other functional polymeric layers may include, for instance, an oxygen barrier layer, an ultraviolet filter layer, an anti-blocking layer, a printed layer, and the like.

The first flexible polymer film 11 and the second flexible polymer film 12 can each be translucent or transparent. If translucent or transparent, for instance, the contents of the package 10 can be viewed from the outside. In another embodiment, however, the first flexible polymer film 11 and the second flexible polymer film 12 can each be opaque. For instance, in one embodiment, the package 10 can display various graphics that identify, for instance, the brand and the description of the product inside. In other embodiments, the first flexible polymer film 11 can be translucent or transparent while the second flexible polymer film 12 is opaque, and the first flexible polymer film 11 can be opaque while the second flexible polymer film 12 is translucent or transparent.

In accordance with the present disclosure, the first film 11 and the second film 12 may be sealed together to form an enclosure 14 and at least one tab area 16. The enclosure 14 may define an interior volume 15 configured to receive a consumer product 50. In one embodiment, a consumer product 50 may be situated in the interior volume 15. The consumer product 50 may be, for example, a food product. In one embodiment, the consumer product 50 may be a cold food product. For example, in one embodiment, the consumer product 50 may be an ice treat, such as an ice pop product or an ice cream product.

In one embodiment, the tab area 16 may be located near the periphery of the first film 11 and the second film 12. In another embodiment, the tab area 16 may be a plurality of tab areas. The tab area 16 may include a breachable bubble 17. The breachable bubble 17 may be formed in a discrete portion of the tab area 16. Sufficient fluid may be trapped within the breachable bubble 17 such that the bubble 17 breaches upon application of minimal pressure by a user, separating a sealed portion of the first film 11 from the second film 12. The fluid may be, for example, a liquid or a gas. In one embodiment, the fluid may be air. In one embodiment, the tab area 16 may include a breach point 18 that is generally oriented towards the periphery of the package. The breach point 18 represents a sealed portion of the first film 11 and the second film 12 that more easily separates than the remainder of the sealed first film 11 and second film 12 when the breachable bubble 17 is breached.

The breachable bubble 17 may provide a distinct breaching sound when the bubble 17 is breached. The breaching sound may be caused by the trapped fluid escaping from the discrete portion of the tab area 16 when the bubble 17 is breached. For example, in one embodiment, the breachable bubble 17 may provide a popping sound, similar to a small balloon popping, when the bubble 17 is breached. In other embodiments, the breachable bubble 17 may provide, for example, a peeping sound, a snapping sound, or a whistling sound.

As shown in FIG. 2, an adhesive layer 13 may provide a seal between the first film 11 and the second film 12. In one embodiment of the present invention, the adhesive layer 13 may have a chemical composition such that the adhesive layer 13 possesses the capability to form a strong bond with itself under the application of pressure. Further, the adhesive layer 13 may have the capability to form a strong bond without the need for the application of elevated temperatures.

In one embodiment, the adhesive layer 13 may comprise a cold seal adhesive (also known as a cohesive, contact adhesive, or self-seal adhesive). For example, the adhesive layer 13 may be a natural rubber-based cold seal adhesive, a synthetic polymer-based cold seal adhesive, or a natural rubber- and synthetic polymer-based cold seal adhesive. Natural rubber-based cold seal adhesives generally contain a natural rubber elastomer, such as a latex, as the predominant ingredient. Other ingredients such as tackifying resins, plasticizers, extenders, stabilizers, antioxidants, or other ingredients may be added to the natural rubber elastomer to modify the adhesive characteristics of the adhesive. Synthetic polymer-based cold seal adhesives generally contain both cohesive components, such as synthetic elastomers, and adhesive components. For instance, a wide variety of synthetic polymers, copolymers, and polymer mixtures may be included in the synthetic polymer-based cold seal adhesive composition, such as acrylic copolymers and styrene butadiene rubbers as base polymers and styrene-acrylic copolymers as secondary polymers, aqueous based polyurethanes and polyurethane isomers, and copolymers of acetate and ethylene.

Natural rubber- and synthetic polymer-based cold seal adhesive generally include a combination of natural rubber elastomers and synthetic polymers as the predominant ingredient. For instance, copolymers of vinyl acetate and ethylene may be combined with natural rubbers to formulate cold seal adhesives.

It should be understood that the adhesive layer 13 is not limited to natural rubber-based cold seal adhesives, synthetic polymer-based cold seal adhesives, or natural rubber- and synthetic polymer-based cold seal adhesives, but may comprise any cold seal adhesive or any adhesive that possesses the capability to form a strong bond with itself under the application of pressure and without the need for the application of elevated temperatures. Further, it should be understood that adhesive layer 13 is not limited to cold seal adhesives. For example, the adhesive layer 13 may comprise a heat seal adhesive, a drying adhesive, an emulsion adhesive, a light curing adhesive, or any other adhesive configured to seal a first flexible polymer film 11 and a second flexible polymer film 12 together.

The present invention is further directed to a process for forming a package that includes a unique opening device for opening the package. In one embodiment, the package of the present invention is formed by providing a first flexible polymer film 11 and a second flexible polymer film 12, sealing the first film 11 and the second film 12 together to form an enclosure 14 and at least one tab area 16, and trapping fluid within a discrete portion of the tab area 16 to form a breachable bubble 17.

In accordance with the present disclosure, a surface of the first film 11 may be coated with an adhesive layer 13, and a surface of the second film 12 may be coated with an adhesive layer 13. In one embodiment, the adhesive layer 13 may have a chemical composition such that it seals to itself under the application of pressure. For example, the adhesive layer 13 coated on a surface of the first film 11 may have the same chemical composition as the adhesive layer 13 coated on a surface of the second film 12. Further, the adhesive layer 13 may have the capability to form a strong bond without the need for the application of elevated temperatures. For instance, in one embodiment, the adhesive may be a cold seal adhesive as described above. As discussed above, it should be understood that the adhesive layer 13 is not limited to cold seal adhesives.

In one embodiment of the present invention, the adhesive layer 13 may coat only the portion of the surface of the first film 11 and second film 12 to be sealed. It should be understood, however, that the adhesive layer 13 is not limited to coating specific portions of the first film 11 and second film 12 to be sealed, and may coat any portion of the first film 11 and the second film 12. For example, in another embodiment, the adhesive layer 13 may coat the entire surface of the first film 11 and the second film 12.

In accordance with the present disclosure, the first film 11 and the second film 12 may be sealed together to form an enclosure 14 and at least one tab area 16. As discussed above, the enclosure 14 may define an interior volume 15 configured to receive a consumer product 50. In one embodiment, a consumer product 50 may be situated in the interior volume 15. As discussed above, in one embodiment, the tab area 16 may be located near the periphery of the first film 11 and the second film 12. In another embodiment, the tab area 16 may be a plurality of tab areas.

As shown in FIGS. 3A, 4A, 5A, and 6A, the step of sealing the first film 11 and the second film 12 together may include applying pressure to portions of the first film 11 and the second film 12 in a direction substantially perpendicular to the surfaces of the first film 11 and the second film 12 to urge the first film 11 and the second film 12 together. In one embodiment, adhesive layer 13 of first film 11 and adhesive layer 13 of second film 12 may seal to each other under the application of pressure, forming a singular adhesive layer 13.

In one embodiment, the step of sealing the first film 11 and the second film 12 together may include operating a sealing means 30 to seal the first film 11 and the second film 12 together. For example, the sealing means 30 may include at least one sealing device 31. The sealing device 31 may be, for example, a roller, a cam, a seal bar, or a seal plate. Further, the sealing means 30 may include any combination of rollers, cams, seal bars, and seal plates. It should be understood that the sealing device 31 is not limited to rollers, cams, seal bars, and seal plates, and may be any sealing mechanism that is operable to seal the first film 11 and the second film 12 together.

For example, in one embodiment as shown in FIG. 3A, the sealing means 30 may be operated such that the sealing devices 31a and 31b apply pressure to portions of the first film 11 and the second film 12 in a direction substantially perpendicular to the surfaces of the first film 11 and the second film 12 to urge the first film 11 and the second film 12 together, thus sealing the first film 11 and the second film 12 together.

In another embodiment as shown in FIG. 4A, the sealing means 30 may be operated such that the sealing devices 31a and 31b apply pressure to portions of the first film 11 and the second film 12 in a direction substantially perpendicular to the surfaces of the first film 11 and the second film 12 to urge the first film 11 and the second film 12 together, thus sealing the first film 11 and the second film 12 together.

In another embodiment as shown in FIG. 5A, the sealing means 30 may be operated such that the sealing devices 31a, 31b, 31c, and 31d apply pressure to portions of the first film 11 and the second film 12 in a direction substantially perpendicular to the surfaces of the first film 11 and the second film 12 to urge the first film 11 and the second film 12 together, thus sealing the first film 11 and the second film 12 together.

In another embodiment as shown in FIG. 6A, the sealing means 30 may be operated such that the sealing devices 31a and 31b are rotatable about a central axis to apply pressure to portions of the first film 11 and the second film 12 in a direction substantially perpendicular to the surfaces of the first film 11 and the second film 12 to urge the first film 11 and the second film 12 together, thus sealing the first film 11 and the second film 12 together.

In accordance with the present disclosure, a breachable bubble 17 may be formed by trapping fluid within a discrete portion of the tab area 16. As discussed above, sufficient fluid may be trapped within the breachable bubble 17 such that the bubble 17 breaches upon application of minimal pressure by a user, separating a sealed portion of the first film 11 from the second film 12.

As shown in FIGS. 3B, 4B, 5B, and 6B, the step of trapping fluid within a discrete portion of the tab area 16 to form breachable bubble 17 may include advancing the application of pressure that is provided during sealing of the first film 11 and the second film 12 together in a direction substantially parallel to the surfaces of the first film 11 and the second film 12.

In one embodiment, the step of trapping fluid within a discrete portion of the tab area 16 to form a breachable bubble 17 may include operating a sealing means 30 to trap fluid. For example, the sealing means 30 may include at least one sealing device 31, as described above.

For example, in one embodiment, the sealing means 30 may first be operated such that the sealing devices 31a and 31b apply pressure to portions of the first film 11 and the second film 12 in a direction substantially perpendicular to the surfaces of the first film 11 and the second film 12 to urge the first film 11 and the second film 12 together, as shown in FIG. 3A, thus sealing the first film 11 and the second film 12 together. The sealing means 30 may then be operated such that the sealing device 31a advances this application of pressure in a direction substantially parallel to the surfaces of the first film 11 and the second film 12, as shown in FIG. 3B, thereby trapping fluid within a discrete portion of tab area 16 to form a breachable bubble 17.

For example, in another embodiment, the sealing means 30 may first be operated such that the sealing devices 31a and 31b apply pressure to portions of the first film 11 and the second film 12 in a direction substantially perpendicular to the surfaces of the first film 11 and the second film 12 to urge the first film 11 and the second film 12 together, as shown in FIG. 4A, thus sealing the first film 11 and the second film 12 together. The sealing means 30 may then be operated such that the sealing devices 31a and 31b advance this application of pressure in a direction substantially parallel to the surfaces of the first film 11 and the second film 12, as shown in FIG. 4B, thereby trapping fluid within a discrete portion of tab area 16 to form a breachable bubble 17.

In another embodiment, the sealing means 30 may first be operated such that the sealing devices 31a, 31b, 31c, and 31d apply pressure to portions of the first film 11 and the second film 12 in a direction substantially perpendicular to the surfaces of the first film 11 and the second film 12 to urge the first film 11 and the second film 12 together, as shown in FIG. 5A, thus sealing the first film 11 and the second film 12 together. The sealing means 30 may then be operated such that the sealing devices 31a, 31b, 31c, and 31d advance this application of pressure in a direction substantially parallel to the surfaces of the first film 11 and the second film 12, as shown in FIG. 5B, thereby trapping fluid within a discrete portion of tab area 16 to form a breachable bubble 17.

In yet another embodiment, the sealing means 30 may first be operated such that the sealing devices 31a and 31b are rotatable about a central axis to apply pressure to portions of the first film 11 and the second film 12 in a direction substantially perpendicular to the surfaces of the first film 11 and the second film 12 to urge the first film 11 and the second film 12 together, as shown in FIG. 6A, thus sealing the first film 11 and the second film 12 together. The sealing means 30 may then be operated such that the sealing devices 31a and 31b are rotatable about the central axis to advance this application of pressure in a direction substantially parallel to the surfaces of the first film 11 and the second film 12, as shown in FIG. 6B, thereby trapping fluid within a discrete portion of tab area 16 to form a breachable bubble 17. Rotation of the sealing devices 31 about the central axis may occur intermittently, or may occur continuously.

It should be understood that the sealing means 30 may include any number of sealing devices 31. Further, it should be understood that the sealing means 30 may include both movable sealing devices 31 and stationary sealing devices 31. For example, in one embodiment, sealing means 30 may be operated such that sealing device 31a is movable in directions substantially parallel to and substantially perpendicular to the surfaces of the first film 11 and the second film 12, and sealing devices 31b, 31c, and 31d may be stationary. In another embodiment, sealing means 30 may be operated such that sealing devices 31a and 31c are movable in directions substantially parallel to and substantially perpendicular to the surfaces of the first film 11 and the second film 12, and sealing devices 31b and 31d may be stationary. In other embodiments, sealing means 30 may include any combination of movable sealing devices 31 and stationary sealing devices 31. In other embodiments, sealing means 30 may include sealing devices 31 that are movable only in a direction substantially perpendicular to the surfaces of the first film 11 and the second film 12 and sealing devices 31 that are movable only in a direction substantially parallel to the surfaces of the first film 11 and the second film 12.

It should be understood that the breachable 17 can be formed so as to project only upwards from tab area 16, only downwards from tab area 16, or both upwards and downwards from tab area 16.

In accordance with the present disclosure as shown in FIG. 7, sealing the first film 11 and the second film 12 together may include forming at least one seam. In one embodiment, sealing the first film 11 and the second film 12 together may include forming a first seam 21, a second seam 22, and a third seam 23. In one embodiment, the first seam 21 may be formed in a direction substantially perpendicular to the second seam 22 and third seam 23. In one embodiment, forming the first seam 21 may form a fin seal. In other embodiments, forming any of the first seam 21, second seam 22, and third seam 23 may form a fin seal.

In one embodiment, forming the second seam 22 and the third seam 23 may form the tab area 16. Further, in one embodiment, forming the third seam 23 may trap fluid within a discrete portion of the tab area 16 to form a breachable bubble 17. In another embodiment, forming the second seam 22 and the third seam 23 may trap fluid within a discrete portion of the tab area 16 to form a breachable bubble 17.

In accordance with the present disclosure, forming the package 10 of the present invention may include the step of providing a consumer product 50 in the interior volume 15. In one embodiment, a fourth seal 24 may be formed to secure the consumer product 50 within the interior volume 15. In one embodiment, forming the fourth seam 24 may form a fin seal.

In one embodiment in accordance with the present disclosure, the first film 11 and the second film 12 may be separate sheets of flexible polymer film. In this embodiment, a fifth seam (not shown) may be formed. For example, in one embodiment, the fifth seam may be substantially parallel to the first seam 21 and spaced from the first seam 21 such that the first film 11 and the second film 12 form an enclosure 14 and at least one tab area 16. In one embodiment, forming the fifth seam may form a fin seal.

It should be understood that the first seam 21, second seam 22, third seam 23, fourth seam 24, and fifth seam may be formed in any order. Further, it should be understood that any of the first seam 21, second seam 22, third seam 23, fourth seam 24, and fifth seam may be formed sequentially or simultaneously.

It should further be understood that sealing the first film 11 and the second film 12 together is not limited to forming any specific number of seams, or to forming seams in any specific direction. For example, any number of seams may be formed in any direction to seal the first film 11 and the second film 12 together to form an enclosure 14 and at least one tab area 16. Further, forming any seam in any direction may form a fin seal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A process for forming a package comprising:
providing a first flexible polymer film and a second flexible polymer film;
sealing the first film and the second film together to form an enclosure and at least one tab area, the enclosure defining an interior volume configured to receive a consumer product; and
trapping a fluid within a discrete portion of the tab area to form a breachable bubble by advancing an application of pressure in a direction substantially parallel to the surfaces of the first film and the second film and simultaneously adhering the first film to the second film along a perimeter of the breachable bubble, said breachable bubble for allowing the enclosure to be easily opened, wherein sufficient fluid is trapped to cause the bubble to breach upon application of pressure by a user, and permitting at least portions of the first film and the second film of said at least one tab area defining the bubble to be easily separated for removing the contents from said enclosure.

2. A process as defined in claim 1, wherein a surface of the first film and a surface of the second film are coated with an adhesive layer in order to form the perimeter of the breachable bubble.

3. A process as defined in claim 2, wherein the adhesive layer comprises a cold seal adhesive.

4. A process as defined in claim 2, wherein the adhesive layer coats only the portions of the surfaces of the first and second films to be sealed.

5. A process as defined in claim 2, wherein the adhesive layer coats the entire surfaces of the first and second films.

6. A process as defined in claim 1, wherein sealing the first film and the second film together comprises applying pressure to portions of the first film and the second film in a direction substantially perpendicular to the surfaces of the first film and the second film.

7. A process as defined in claim 1, wherein sealing the first film and the second film together comprises operating a sealing means to seal the first film and the second film together.

8. A process as defined in claim 7, wherein the sealing means comprises at least one sealing device selected from the group consisting of rollers, cams, seal bars and seal plates, and combinations thereof.

9. A process as defined in claim 1, wherein trapping fluid comprises operating a sealing means to trap fluid.

10. A process as defined in claim 9, wherein the sealing means comprises at least one sealing device selected from the group consisting of rollers, cams, seal bars and seal plates, and combinations thereof.

11. A process as defined in claim 1, wherein the tab area is located near the periphery of the first and second films.

12. A process as defined in claim 1, wherein sealing the first film and the second film together comprises forming a first seam, a second seam, and a third seam, the first seam formed in a direction substantially perpendicular to the second and third seams.

13. A process as defined in claim 12, wherein forming the second and third seams forms the tab area.

14. A process as defined in claim 13, wherein forming the third seam traps fluid within a discrete portion of the tab area to form a breachable bubble.

15. A process as defined in claim 13, wherein forming the second and third seams traps fluid within a discrete portion of the tab area to form a breachable bubble.

16. A process as defined in claim 1, further comprising the step of providing a consumer product in the interior volume.

17. A process for forming a package comprising:

providing a first flexible polymer film and a second flexible polymer film wherein a surface of the first film and a surface of the second film are coated with an adhesive layer;

sealing the first film and the second film together to form an enclosure and at least one tab area, the enclosure defining an interior volume configured to receive a consumer product; and trapping a fluid within a discrete portion of the tab area to form a breachable bubble by advancing an application of pressure in a direction substantially parallel to the surfaces of the first film and the second film and simultaneously adhering the first film to the second film along a perimeter of the breachable bubble, said breachable bubble for allowing the enclosure to be easily opened, wherein sufficient fluid is trapped to cause the bubble to breach upon application of pressure by a user, and permitting at least portions of the first film and the second film of said at least one tab area defining the bubble to be easily separated for removing the contents from said enclosure.

18. A process as defined in claim 17, wherein a breach of the breachable bubble provides access to the enclosure.

19. A process as defined in claim 17, wherein the enclosure is a single enclosure and wherein the interior volume is a single interior volume.

* * * * *